United States Patent [19]

Mackes

[11] 4,330,500
[45] May 18, 1982

[54] METHODS OF MANUFACTURING DOUBLE-FLANGED WINDOW WELL COVER

[75] Inventor: Ronald C. Mackes, Crestone, Colo.

[73] Assignee: B Q P Industries, Inc., Denver, Colo.

[21] Appl. No.: 260,084

[22] Filed: May 4, 1981

Related U.S. Application Data

[62] Division of Ser. No. 127,972, Mar. 7, 1980.

[51] Int. Cl.³ .................. B29C 17/04; B29C 17/14
[52] U.S. Cl. .................. 264/554; 52/107; 264/157; 264/160
[58] Field of Search ........... 264/553, 554, 157, 160, 264/292, 544, 547–552; 425/302.1, 388; 52/107, 200, 202

[56] References Cited

U.S. PATENT DOCUMENTS

| | | |
|---|---|---|
| 2,365,637 | 12/1944 | Helwig . |
| 2,372,939 | 4/1945 | Elliott . |
| 2,761,180 | 9/1956 | Krelwitz . |
| 2,863,177 | 12/1958 | Nelson et al. |
| 2,898,638 | 8/1959 | Drucixhammer . |
| 2,939,375 | 6/1960 | Herman . |
| 2,968,064 | 1/1961 | Howell . |
| 3,085,489 | 4/1963 | Ivy . |
| 3,123,868 | 3/1964 | Gust . |
| 3,128,508 | 4/1964 | Burnham . |
| 3,232,014 | 2/1966 | Frost . |
| 3,574,807 | 4/1971 | Heavener . |
| 3,640,666 | 2/1972 | Jode et al. |
| 3,844,076 | 10/1974 | Schock . |
| 4,009,981 | 3/1977 | Rosen . |
| 4,157,884 | 6/1979 | Andraf . |

*Primary Examiner*—Jan H. Silbaugh

[57] ABSTRACT

The method comprises gripping the edges of a sheet of thermoplastic resin in a drawing frame, heating the sheet to a drawing temperature, drawing the sheet within the frame against a mold to a spheroidlike hemisphere, drawing an outstanding double-walled ridge about the transverse equator of the spheroidlike hemisphere and forming a central groove in the crest of the ridge. The spheroidlike hemisphere is divided, as by sawing or routing, along the groove at the crest of the ridge and across the undrawn material, thereby forming a pair of window well covers with the undrawn material at the frame providing a first flange of each, and the two walls of the ridge providing a second flange of the respective covers. The portion of the groove remaining with each separated ridge wall provides reinforcing curl along the edge of each second flange, while excess undrawn material may be removed to trim the first flange of each cover. The mold is preferably a male mold conforming to the interior of the spheroidlike hemisphere and having an equatorial outwardly extending ridge with a central slot for forming the groove by sealing the sheet at the base of the mold and producing a vacuum to pull the sheet into the slot in the said ridge. The male mold also has outstanding ridges perpendicular to the equatorial ridge for forming corresponding ribs for reinforcement.

10 Claims, 10 Drawing Figures

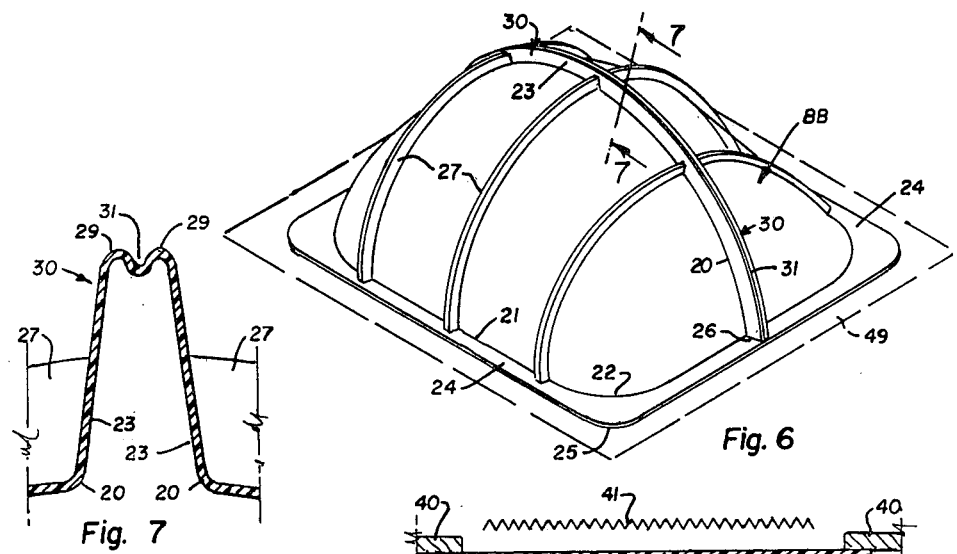
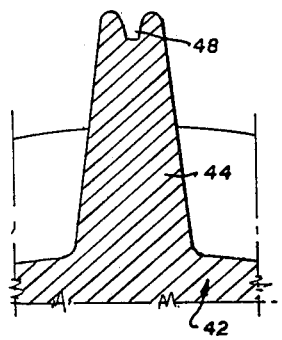
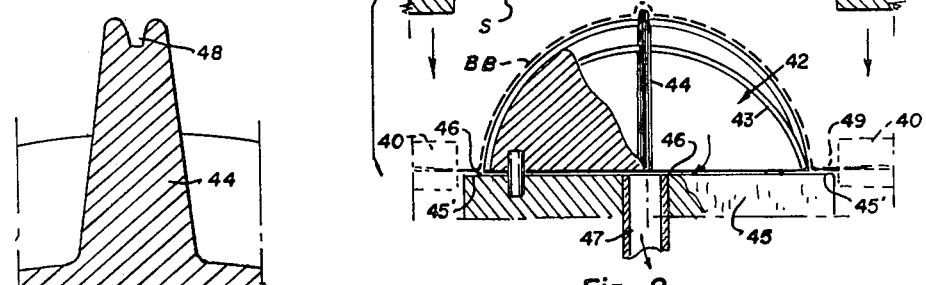
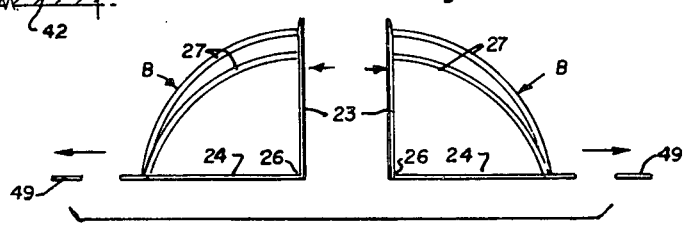
Fig. 6
Fig. 7
Fig. 8
Fig. 9
Fig. 10

METHODS OF MANUFACTURING DOUBLE-FLANGED WINDOW WELL COVER

This application is a division of my copending application Ser. No. 127,972, filed Mar. 7, 1980.

This invention relates to improvements in methods of manufacturing well covers, and more particularly to such a method which produces, by drawing a thermoplastic, a transparent window well cover having perpendicular flanges integral with the cover and integral with each other at the corners of the cover.

With the development of synthetic thermoplastic resins which are transparent, weather-resistant and easily molded or drawn, window well covers have become popular commercial items and the demand has increased over the years. At the same time, the manufacturer of the covers has become more competitive leading to improved techniques and designs. The present invention is concerned with such an improvement as will hereinafter appear.

The primary component of a window well cover is formed as a quadrant of a spheroid-like form, which will sometimes be hereinafter called a "bubble." It is to be understood that the bubble form may be varied considerably. Also, the designation "a quadrant of a spheroid-like form" is selected because the sides, or edges, of the bubble forming the quadrant lie in perpendicular planes and these edges meet at opposite corners of the bubble. Thus, one side or edge of the bubble is placed over a window well and the other side or edge of the bubble is placed against the wall of a building. Supplementing this bubble to form the cover, reinforcements such as flanges or cleats may be used at one or both edges of the bubble to rigidify the cover and to assist in fastening it to a window well and/or to a building wall. Also a flange can be used to better direct drainage from the cover surface.

Such flanges may be of metal or plastic strips which are connecting to an edge of the bubble, or if of plastic, a flange may be integral with the bubble. The type and number flanges used with a bubble to complete a window well cover is dependent upon the manner in which the window well cover is made, and also upon the thickness and rigidity of the material forming the cover.

Because of their comparatively large size, window well covers are best made by thermo-forming thermoplastic resin sheets. Such resins may be Cellulose Acetate Butyrate, Acrylic Polymers (ABS) and polycarbonates. At present, cellulose acetate butyrate is a preferred material because it has good physical properties, resists sunlight and weather and is not unduly expensive. Regardless of the material used, the thermo-forming process commonly used is to vacuum or pressure draw a heated sheet of material into a female mold or over a male mold. Ordinarily, a pair of opposing interconnected window well covers are produced in a single operation. The formation of a quadrant by drawing would be difficult but the formation of a hemisphere-like unit, consisting of two quadrants, is a normal, easy drawing operation. The two opposing window well bubbles are then cut apart with a saw or a router.

At the same time the flashing or edges of the sheet which is held by the drawing frame may be trimmed to constitute a flange on each window well cover. Thus, each window well cover will have a ready-made flange at one edge of the bubble but not at the other. Various window well designs will use this flange at the wall of a building or at the top of the window well. The edges of the window well bubbles formed by cutting two opposing window well covers apart is then reinforced by cleats or by metal or plastic flanges attached to it. In some types of covers, the thickness and rigidity of the bubble itself is sufficient and reinforcement is unnecessary.

With a growing demand for larger window well covers, problems arise in attaining sufficient rigidity in the covers without making the covers excessively thick. Also, there is a demand for light-weight, economical covers, and rigidity is an important consideration in the cover design. A bubble can be rigidified by corrugations. The flashing forming a flange is naturally rigid except at the corners of the cover where the flange terminates. The unflanged side creates a problem, however, because the attachment of a supplementary flange or a reinforcing strip is not always satisfactory and can be quite expensive.

The present invention was conceived and developed with the foregoing and other considerations in view, and the invention comprises, in essence, gripping the edges of a sheet of thermoplastic resin in a drawing frame and heating the sheet to a drawing temperature, drawing the sheet within the frame to a spheroid-like hemisphere and thereby forming a pair of connected opposing bubbles, drawing an outstanding double-walled ridge about the transverse equator of the spheroid-like hemisphere dividing the opposing bubbles and separating the opposing bubbles at the crest of the ridge to provide two window well covers. The undrawn material at the frame becomes a first integral flange of each cover, while one wall of the double-walled ridge becomes a second integral flange of each cover and excess undrawn material at the frame is removed to trim the first flange. Preferably, a central groove is drawn in the crest of the ridge to facilitate separation of the opposing covers and also to form a reinforcing curl at the edge of each of the second flanges.

Among the objects of this invention is to provide a method for making an improved window well cover having an integral flange at both the front and rear of the bubble; to provide such a method by which such flanges may be made integral with each other at opposite corners of the bubble; to provide such a method by which a rigidifying curl may be formed on the curved flange, which normally overlies the window well frame; to provide such a method which is simple and economical through drawing a heated sheet of thermoplastic; and to provide such a method which will produce a comparatively large number of window well covers in a comparatively short time.

With the foregoing and other objects in view, my invention comprises certain steps, sequences and operations, all as hereinafter described, defined in the appended claims and illustrated in preferred embodiment in the accompanying drawings, in which:

FIG. 6 is an isometric view of a hemispherical configuration drawn from a thermoplastic sheet by the method of this invention and containing a pair of interconnected opposing window well covers.

FIG. 7 is an enlarged fragmentary sectional view taken along line 7—7 of FIG. 6, showing a ridge structure of interconnecting flanges separable to produce a pair of window well covers.

FIG. 8 is a diagrammatic view of an arrangement of components which illustrate steps in the method of this invention to produce the hemispherical configuration shown in FIG. 6, by using a male mold.

FIG. 9 is an enlarged fragmentary sectional view of a ridge portion of a mold shown in FIG. 8, which forms the ridge structure shown in FIG. 7.

FIG. 10 is a diagrammatic view illustrating final trimming and separating steps which complete the production of window well covers, shown interconnected in FIG. 6.

Figures 1, 2:
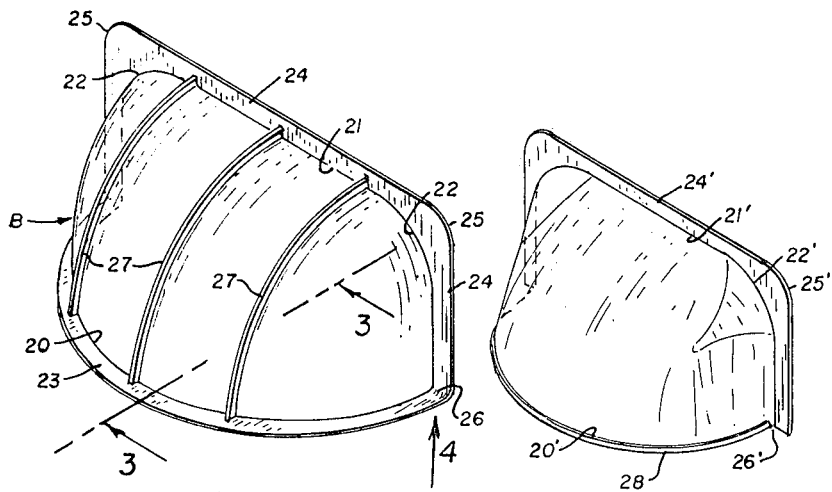
FIG. 1 is an isometric view of a window well cover produced by the method of the present invention.
FIG. 2 is an isometric view of a window well cover of a type which is exemplary of the prior art.
Figures 3, 4:
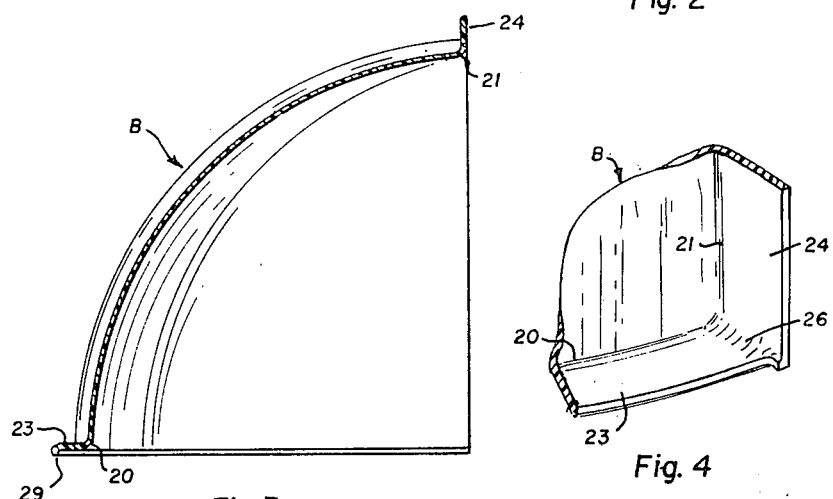
FIG. 3 is a transverse sectional view, taken along line 3—3 of FIG. 1 but on an enlarged scale.
FIG. 4 is an enlarged, fragmentary, isometric view of a corner portion of the window well cover shown in FIG. 1, as from the position of arrow 4 of FIG. 1.

Referring more particularly to the drawing, FIG. 1 shows one form of a window well cover produced by the method of this invention. A bubble B is the quadrant of a spheroidlike form. This bubble has a generally circular, or elliptical, base edge 20 and a rectangular back edge 21 with radii 22 at the corners. A base flange 23 outstands from the base edge and a wall flange 24 upstands from the back edge 21. The base flange 23 is arcuate following the form of the base edge 20 and the wall flange 24 is rectangular following the form of the back edge 21. The corners 25 of this wall flange 24 are suitably rounded to provide a neat appearing unit. The base flange 23 is integral with the bubble at base edge 20 and the wall flange 24 is integral with the bubble at the back edge 21, while the base flange and wall flange are integral where they come together at the corners 26 of the cover, as shown particularly in FIG. 4.

The bubble B, defined as a spheroidlike quadrant, may vary considerably in form from that illustrated at FIG. 1. For example, both edges 20 and 21 may be arcuate or both edges may be rectangular. Also, it is to be understood that the cover, as shown, may be rotated and reversed so that the base flange 23 will lie against a wall and the wall flange 24 will lie upon a window well. This is advantageous because some window wells are circular and others are rectangular.

To further reinforce the cover, ribs 27 may be molded in the bubble B as shown, and while various rib patterns may be used, these patterns should be oriented in such a manner as to permit the cover to be easily removed from a mold when it is being formed.

FIG. 2 shows a window well cover of a conventional type, representative of the prior art. A bubble B' has a base edge 20', a rectangular back edge 21' with radii 22' at the corners. A wall flange 24' upstands from the back edge 21' and the corners 25' of the wall flange are suitably rounded to provide a neat appearing unit. Since prior producers of window well covers from drawn thermoplastic sheets have been unable to produce a base flange, the unit has a reinforcing strip 28 at the base edge 20'. The expense of the reinforcing strip 28, the chore of applying it and the fact that it does not connect with the wall flange 24' at the corners 26' to help rigidify the unit are undesirable features especially when the covers are being produced in large numbers.

Figure 5:
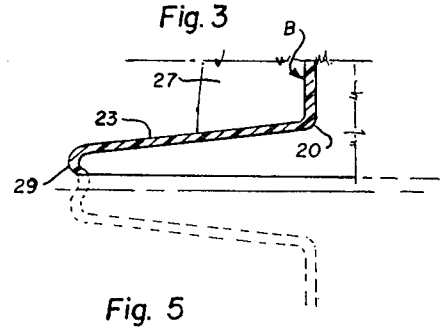
FIG. 5 is a fragmentary sectional view of an edge portion of the cover of FIG. 3, but on an enlarged scale and with dotted lines depicting an outline of a corresponding portion of an opposing window well cover during the manufacture thereof.

FIG. 5 shows in detail the construction of the base flange 23. This flange is inclined downwardly from the bubble B at a small angle and the outer edge extends downwardly as a lip, such as also extending inwardly as a small curl 29. This feature provides an underlip construction which reinforces the entire structure of the cover. The curl 29 also facilitates manufacture of the improved cover as now described.

The improved method of producing window well covers includes drawing operations in which a sheet of heated thermoplastic resin is drawn into a female mold or onto a male mold. A vacuum and/or air pressure may be used to bring the sheet snugly against the contours of the mold. Preferably, but not necessarily, the drawing operation is onto a male mold since it has been found that a better distribution of material, with a minimum of thin portions, would occur when the draw is over a male mold and the method of this invention is therefore illustrated and described in this best mode embodiment.

Since a spherical quadrant form of cover would necessitate a difficult drawing operation, the improved method produces a pair of interconnected, opposing units to produce a hemispheroidal-like bubble BB, as shown in FIG. 6. The interconnection of the units is at the edges of the base flanges 23 and these base flanges 23 combine to form a central ridge 30 over the hemispheroidal-like bubble BB, of the two opposing covers. The wall flanges 24 are at the base of the bubble BB and are trimmed flashing edges of the plastic sheet from which the bubble BB is drawn.

The curls 29 at the underside of each flange 23, as in FIG. 5, extend into a central groove 31 at the top of ridge 30, as best shown in FIG. 7. This groove 31 guides and assists an operator in separating the two opposing window well covers, as with a saw or router. This groove is formed by vacuum action in a slot of the mold, as will be described.

Referring to FIG. 8, the operational steps for manufacturing the interconnected pair of opposing window well covers include the step of grasping a plastic sheet S in a rectangular, clamping frame 40 and subjecting the plastic sheet S to heat as from an electrical resistance source, indicated at 41. When the plastic sheet has attained a drawing temperature, which can be easily ascertained by a skilled operator, the frame 40 is moved downwardly to cause the heated plastic sheet to engage a male mold 42.

Male mold 42 is shaped to form the hemispheroidal bubble BB and includes ridges 43 to form ribs 27 and an equator ridge 44 for shaping the central plastic ridge 30. The male mold 42 is mounted upon a table 45 with a space 46 between the mold 42 and table 45 for the evacuation of air from the mold when the plastic sheet covers it. A conduit 47, connected with a vacuum pump, is provided for this purpose.

The table 45 is larger than the mold to project a short distance from each side edge, as indicated at 45', while the inside dimensions of the frame 40 are such that the frame will move past the edges of the table to place the plastic sheet upon the edges of the table 45 as shown in broken lines at FIG. 8. Once so positioned the vacuum action can then take over and this action pulls the plastic sheet tightly against the mold 42. A slot 48 in the equator ridge 44, shown at FIG. 9, permits the vacuum effect to pull the area of the central ridge 30 tightly against the equator ridge 44 of the mold and also pull the central groove 31 of the ridge 30 at least part way into this slot 48.

After the vacuum acts to pull the sheet S against the mold, the hemispheroidal bubble BB is allowed to cool in a conventional manner and the pair of interconnected window well covers BB is then removed from the mold 42 and released from the frame 40. Subsequent production steps include trimming the edge portions of the flashing 49 of the sheet, which were held by the frame 40 to form the flanges 24. The final step includes separating the covers by cutting through the sheet at the central groove 31 as with a saw or router, as indicated previously. These finishing operations are diagrammatically illustrated in FIG. 10.

I have now described my invention in considerable detail. However, it is obvious that others skilled in the art can build and devise alternate and equivalent constructions and steps and sequences which are, nevertheless, within the spirit and scope of the invention. Hence, I desire that my protection be limited, not by the constructions herein described, but only by the proper scope of the appended claims.

What is claimed is:

1. A method for the manufacture of a double flanged window well cover comprising a bubble formed as a spheroid-like quadrant, a first integral flange at one edge and a second integral flange at the other edge, said second flange being perpendicular to said first flange and said flanges being integral at opposite corners of the bubble, said method including the steps of:
   (a) gripping the edges of a sheet of thermoplastic resin in a drawing frame and heating the sheet to a drawing temperature;
   (b) drawing the sheet within the frame to a spheroid-like hemisphere, thereby forming a pair of connected opposing bubbles with the undrawn material at the frame adapted to provide said first flange of a window well cover formed from each of the opposing bubbles;
   (c) drawing an outstanding double-walled ridge about the transverse equator of the spheroid-like hemisphere; and
   (d) separating the connected opposing bubbles at the crest of the ridge and across the undrawn material, whereby the two walls of the ridge provide said second flange of the respective window well covers.

2. The method defined in claim 1, including:
removing excess undrawn material to trim said first flange of the cover formed from the separated bubbles.

3. The method defined in claim 1, including:
drawing a central groove in the crest of said ridge to facilitate separation of the opposing bubbles at the center of said groove, the portion of said groove remaining with each separated bubble providing a curl at the edge of each second flange of the covers formed from said separated bubbles.

4. A method as defined in claim 1, including:
drawing offset ribs in said sheet extending in a direction perpendicular to said central ridge.

5. A method as defined in claim 4, including:
drawing said ribs so as to be exteriorly convex.

6. A method as defined in claim 1, including:
causing said heated thermoplastic sheet to engage a mold to form said spheroid-like hemisphere and said outstanding doublewalled ridge.

7. A method as defined in claim 6, including:
causing said heated thermoplastic sheet to engage a male mold conforming to the interior of said spheroid-like hemisphere and having an equatorial outwardly extending ridge.

8. A method as defined in claim 7, which includes:
causing said heated thermoplastic sheet to engage a mold having outstanding ridges perpendicular to said equatorial ridge for forming corresponding ribs in said spheroid-like hemisphere.

9. A method as defined in claim 7, wherein said ridge is provided with a central slot and including:
moving said heated thermoplastic sheet against said mold to form said spheroid-like hemisphere and said ridge;
sealing said sheet at the base of said spheroid-like hemisphere;
subjecting said hemisphere to vacuum, to pull said sheet into said slot in said ridge and form a groove in the crest of said ridge; and
separating said hemisphere into a pair of bubbles by cutting through said groove and the portions of the undrawn sheet in alignment therewith.

10. A method as defined in claim 9, including:
causing said heated thermoplastic sheet to engage a mold having outstanding ridges perpendicular to said equatorial ridge for forming corresponding ribs in said spheroid-like hemisphere; and
removing excess undrawn material from the first flange of each cover produced by separating said bubbles of said hemisphere.

* * * * *